United States Patent [19]

Gomi et al.

[11] Patent Number: 5,215,601
[45] Date of Patent: Jun. 1, 1993

[54] ADDITIVE FOR FLUXES AND SOLDERING PASTES

[75] Inventors: Tadashi Gomi; Yuji Douzaki, both of Tokyo, Japan

[73] Assignee: Yuho Chemicals Inc., Tokyo, Japan

[21] Appl. No.: 868,416

[22] Filed: Apr. 15, 1992

[30] Foreign Application Priority Data

Apr. 17, 1991 [JP] Japan .................................. 3-112550

[51] Int. Cl.$^5$ .............................................. B23K 35/34
[52] U.S. Cl. ....................................................... 148/23
[58] Field of Search ........................................... 148/23

[56] References Cited

U.S. PATENT DOCUMENTS 2,452,494 10/1948 Rollason ................................ 148/23
2,745,769 5/1956 Linnert .................................. 117/132
4,919,731 4/1990 Iyogi ...................................... 148/25

FOREIGN PATENT DOCUMENTS 413312 2/1991 European Pat. Off. .

*Primary Examiner*—Peter D. Rosenberg
*Attorney, Agent, or Firm*—Burns, Doane, Swecker and Mathis

[57] ABSTRACT

An additive contains a silicone resin as a deactivation agent which functions at soldering temperature. This novel additive is used for fluxes and soldering pastes. In the course of soldering, the silicone resin in the additive deactivates an activator such as organic acids contained in the flux and the soldering paste in order for removal of an oxide film from a metallic base used for electric circuit. By use of the additive, corrosion of the metallic base with the activator is protected even though the activator remains on the base. The additive enables to omit an unnecessary washing step from a preparation of electric circiut.

19 Claims, No Drawings

ADDITIVE FOR FLUXES AND SOLDERING PASTES

BACKGROUND OF THE INVENTION

1. Field of the Invention

The present invention relates to an additive for fluxes and soldering pastes, a flux containing the additive and a soldering paste containing the flux.

In the field of electronics, fluxes are widely used for the purpose of removal of an oxide film on a metallic base. The flux of the present invention is a novel flux which never corrodes metallic bases and never cause sticking even though it remains on metallic bases after soldering.

2. Description of the Related Art

In a general method for soldering electronic parts on a metallic base (for example, a copper base) for electronic circuits, a surface of the base is treated with a flux to remove oxide film and then the surface is dipped into a melted solder bath.

However, this method requires two steps: (1) treatment with the flux and (2) dipping into the solder bath. Further, in this method, some of the electronic parts put on the base occasionally become dislodged from the base in the course of the steps.

In order to solve these problems, the method using a soldering paste containing a flux and solder particles has been developed. According to the method, the soldering paste is applied on a base by, for example, a dispenser and then heated or irradiated with ultraviolet light to complete soldering. Since the soldering paste is viscous, electronic parts are easily held on the base.

However, even the above method has some disadvantages. The soldering paste contains an activator such as organic acids and organic acid salts in order to completely remove oxide film on the base. After soldering, the soldered base has to be washed to remove the activator because the corrosion of the base with the remaining activator continues after completion of the soldering operation.

In general, a solvent of fluorohydrocarbons such as Freon and water are used for this washing. However, the use of fluorohydrocarbons tends to be prohibited because they have harmful effects on the atmospheric environment. Further, if water is used for the washing, the resulting waste water is polluted with heavy metals and cannot be discharged without removal of the metals.

European Patent Publication No. 0413312A1 discloses a non-washing type flux and a soldering paste containing this flux which does not corrode metallic bases even though the soldered bases are not washed after soldering.

A heat treatment for soldering electronic parts on bases for electric circuit is conducted at 200°–250° C. for 2–5 seconds in order to prevent heat damage to the electronic parts.

Since the heat treatment period is relatively short, when the amount of the flux described in the above EP Publication is small, a part of the activator does not react with the flux and remains on the bases. If the amount of the flux is increased to promote the reaction of the activator with the flux, the excess and unreacted flux remains on the bases and causes sticking.

Therefore, an object of the present invention is to provide a soldering paste which contains an activator and does not continue to corrode a base after soldering even though the soldered base is not subjected to a washing step.

Another object of the present invention is to provide a flux which contains an activator and does not continue to corrode a base after soldering even though the flux is contained in a soldering paste and the base soldered with this paste is not subjected to a washing step.

A further object of the present invention is to provide an additive for a flux and a soldering paste containing an activator, which is contained in the flux and the soldering paste and deactivates the activator completely in the course of soldering of electronic parts in a relatively smaller amount.

SUMMARY OF THE INVENTION

The present invention relates to an additive for fluxes and soldering pastes which have an organic acid or an organic acid salt wherein the additive comprises at least one silicone resin as a deactivation agent which reacts with the organic acid or the organic acid salt in the course of soldering.

Further the present invention relates to a flux comprising an organic acid or organic acid salt wherein the flux further comprises at least one silicone resin as a deactivation agent which reacts with the organic acid or the organic acid salt in the course of soldering.

In addition, the present invention relates to a soldering paste comprising the above-mentioned flux and solder particles.

DETAILED DESCRIPTION OF THE INVENTION

The present invention will now be explained in detail below.

A flux and a soldering paste, according to the invention contain an organic acid or an organic acid salt as the activator which removes an oxide film on a metallic base.

The present invention utilizes the reaction of the organic acid or the organic acid salt with a deactivation agent in the course of soldering. The deactivation agent used in the present invention does not function at ordinary temperature but functions in the vicinity of soldering temperature. The silicone resins used in this invention as the deactivation agent do not react with the acid or the salt at ordinary temperature but react at a temperature in the vicinity of soldering temperature.

The silicone resins in the invention are thermosetting silicone resins which have silanol groups or silanol and methoxy groups therein and include ordinary silicone resins and modified silicone resins.

Examples of the ordinary silicone resins include methylsilicone resins and methylphenylsilicone resins. The methysilicone resins are copolymers which generally have the combination of $SiO_2$, $CH_3SiO_{3/2}$, $(CH_3)_2SiO$ and $(CH_3)_3SiO_{\frac{1}{2}}$ units. The methylphenylsilicone resins are copolymers which generally have the combination of $CH_3SiO_{3/2}$, $(CH_3)_2SiO$, $C_6H_5SiO_{3/2}$, $(C_6H_5)(CH_3)SiO$ and $(C_6H_5)_2SiO$ units.

Examples of the modified silicone resins include alkyd modified silicone resins, polyester modified silicone resins, acryl modified silicone resins, epoxy modified silicone resins, phenol modified silicone resins, urethane modified silicone resins and melamine modified silicone resins. These modified silicone resins are obtained by the reaction of silanol groups and methoxy groups of the silicone resins with functional groups such as hydroxyl groups of resins used for modification.

From the viewpoint that the deactivation agent reacts completely with the activator under the heat condition of 200°-250° C. for 2-5 seconds, the use of the modified silicone resins having silanol groups and methoxy groups, especially epoxy modified silicone resins or phenol modified silicone resins is preferred. Further any silicone resins are usable in this invention, regardless of its molecular weight.

The concentration of the silicone resins in the additive of the present invention is not limited but preferably ranges, for example, between about 10 and 100 wt % based on the weight of the additive.

The additive of the present invention may further comprise a solvent. Any solvent dissolving the deactivation agent is usable without limitation. It is provided that the use of the solvent with a boiling point lower than the melting point of soldering particles is preferred. The soldering temperature has to be relatively higher than the melting point of the soldering particles. If a solvent with a boiling point higher than the melting point is used, the properties of the obtained electronic circuit may be deteriorated.

In particular, with respect to solvents with a carboxyl group or a hydroxyl group, a boiling point of the solvent is preferably lower than the reaction temperature of the silicone resin with the activator from the viewpoint of facility of reaction between the deactivation agent and the activator.

Examples of the solvents include aliphatic compound (n-hexane (b.p. 68.7)(hereinafter, the number in parentheses is the boiling point), isohexane (60–64), n-heptane (98.4)), esters (isopropyl acetate (89.0), methyl propionate (79.7), ethyl propionate (99.1)); ketones (methylethylketone (79.6), methyl-n-propylketone (103.3) diethylketone (102.2)); alcohols (ethanol (78.3), n-propanol (97.2), isopropanol (82.3), isobutanol (107.9), secondary butanol (99.5)); propylene glycol ethers (propylene glycol monomethylether (120.1), propylene glycol monoethylether (132.0), propylene glycol tert-butylether (151), dipropylene glycol monomethylether (188.3), dipropylene glycol monoethylether (197.8), tripropylene glycol methylether (242.4), propylene glycol methylether acetate (146 0), propylene glycol ethylether acetate (158.0)); ethylene glycol ethers (ethylene glycol monomethylether (124.6), ethylene glycol monoethylether (135.5), ethylene glycol monobutylether (171.1), diethylene glycol monomethylether (194.2), diethylene glycol monoethylether (201.9), diethylene glycol monobutylether (230.0), ethylene glycol ethylether acetate (156.3)); 3-methyl-3-methoxybutanol (174) and 3-methyl-3-methoxybutylacetate (188) and the like.

The flux of the present invention will now be explained. The flux of the present invention contains the above-mentioned silicone resin and the activator such as organic acids and organic acid salts and if necessary a solvent.

The organic acid and the organic acid salt act as the activator. The activator in the flux acts to remove an oxide film on the base at ordinary temperature as the soldering paste containing the flux is applied on a metallic base.

Examples of the organic acid include monocarboxylic acids (formic acid, acetic acid, propionic acid, capronic acid, enanthic acid, caprilic acid, pelargonic acid, capric acid, undecanoic acid, lauric acid, myristic acid, palmitic acid, stearic acid), dicarboxylic acids (oxalic acid, malonic acid, succinic acid, glutaric acid, adipic acid, pimelic acid, suberic acid, azelaic acid, sebacic acid), oxycarboxylic acids (oxysuccinic acid, citric acid, tartaric acid, hydroxyacetic acid, salicylic acid, (m-, p-) hydroxybenzoic acid, 12-hydroxydodecanoic acid, 12-isobutyric acid, (o-, m-, p-) hydroxyphenylacetic acid, 4-hydroxyphthalic acid, 12-hydroxystearic acid) and the like.

Examples of the organic acid salt include salts of the above-mentioned organic acid with an amine (for example, diethylaminoethanol), ammonia and an alkali metal (for instance, sodium, potassium and the like). Amine salts of halogen containing acids such as hydrochloric acid and bromic acid, for example, diethyl amine hydrochlorate and ethylamine bromate may be used as the activator in addition to the organic acid and the organic acid salt.

The flux of the present invention may also contain the above-mentioned solvent.

The content of the silicone resin as compared to the content of the organic acid or the organic acid salt (or a mixture thereof) in the flux is expressed in the molar ratio of COOH groups contained in the organic acid or the organic acid salt to the silanol groups in the silicone resin (COOH:SiOH) suitably ranges from 1:0.05–10, preferably 1:0.5–1.5 from the viewpoint of effective prevention of a metallic base from corroding.

It is suitable that the content of the organic acid, the organic acid salt, the silicone resin and the solvent in the flux of the present invention are as follows: organic acid and/or organic acid salt: 0.1–20 parts by weight, silicone resin: 0.05–80 parts by weight, solvent: 10–99.85 parts by weight.

The flux of the present invention may contain a rosin in addition to the components such as the organic acid and the like. Various rosins may be used as the rosin. Rosin modified with maleic acid, rosin ester modified with moleic acid, hydrogenated rosin, disproportionated rosin, polymerized rosin, gum rosin, wood rosin, tall oil rosin and the like are exemplified. Especially, taking into consideration the corrosiveness of solder, the use of esterified rosin such as rosin ester modified with maleic acid is preferred.

The main component of the rosin is abietic acid or abietic acid type compounds such as isomers or polymers of abietic acid. Abietic acid and abietic acid type compounds do not exhibit activity at ordinary temperature, and under heating at 90° C. or more, they melt and exhibit activity to remove an oxide film on a metallic base. Thus they are not corrosive in storage at ordinary temperature.

Therefore, in the present invention, any rosin containing abietic acid or abietic acid type compounds is usable.

The content of rosin may range, for example, from 10 to 10000 parts by weight based on 100 parts by weight of the organic acid or the organic acid salt.

The soldering paste of the present invention contains solder particles in addition to the above-mentioned flux. The "solder particles" used herein include not only tin-lead alloys generally known as the solder but also alloys further containing silver, bismuth, gold, iridium and the like.

The shape of the solder particles is not limited. The particle size suitably ranges from 10 to 1000 mesh, preferably from 250 to 400 mesh.

The weight ratio of the solder particles to the flux is not limited but it is preferred that the amount of the solder particles ranges from 40 to 95 parts by weight and that of the flux ranges from 5 to 60 parts by weight.

The soldering paste of the present invention may further contain a thixotropic thickener and the content of the thickener may be between 0.1 and 20 weight %, preferably between 1 and 15 weight % of the paste.

The present invention will be illustrated in more detail with reference to the following Examples.

EXAMPLES

Example 1 (Flux composition)

An organic acid (or an organic acid salt), a rosin, an activator and a solvent are added to a preparation vessel with an agitation apparatus and stirred to dissolve perfectly all components. After dissolution of the materials, a silicone resin is added to obtain a flux composition. The charging amounts of each component are listed in Table 1.

Silicone resins used in the Example are as follows:

Modified silicone varnish KR-211, modified silicone varnish KR-216, modified silicone varnish KR-213, modified silicone varnish KR-9218, silicone epoxy varnish ES-1001N and silicone alkyd varnish KR-206 were purchased from Shinetsu Kagaku Industry Inc. in Japan. Silicone varnish DK X8-8048-4 was purchased from Toray Dow Corning Silicone Inc. in Japan.

Properties of the above silicone resins are listed in Table 2.

TABLE 2

| Additive | Nonvolatile (solvent) | Functional groups Kind | Content* | Equivalent |
|---|---|---|---|---|
| KR-211 | 70% (xylene) | hydroxy | 4% | about 400** |
| KR-216 | nonsolvent | hydroxy | 5.5% | about 300** |
| KR-213 | nonsolvent | methoxy | 20% | about 160*** |
| KR-9218 | nonsolvent | methoxy | 15% | about 210*** |
| ES-1001N | 45% (xylene+) | hydroxy | — | — |
| KR-206 | 50% (xylene) | hydroxy | — | — |
| DK X8 8048-4 | nonsolvent | hydroxy | 4% | about 410** |

*content as compared to nonvolatile parts
**weight of varnish per 1 mole of hydroxy group
***weight of varnish per 1 mole of methoxy group The spread factor, corrosiveness and stickness of the resulting flux compositions were estimated. The spread factor was measured according to U.S. Standard QQ-S-571E. The corrosiveness was measured based on JIS-Z-3197 6.6.

The stickness was estimated as follows: Copper plates were pretreated by the same procedures as those of the estimation of corrosiveness (JIS-Z-3197 6.6) and treated with the flux compositions followed by heat treatment at 250° C. for 5 seconds. After the resulting plates were dried at room temperature, the plates were touched with a finger and classified into 3 groups: "No thicking (No)", "slight sticking (Slight)" and "sticking".

The results are shown in Table 3.

TABLE 3

| Flux | Spread factor | Corrosiveness | Stickness |
|---|---|---|---|
| Composition of the Invention | | | |
| 1-1 | 80 | Ex | No |
| 1-2 | 75 | Ex | No |
| 1-3 | 83 | Ex | No |
| 1-4 | 76 | Ex | No |
| 1-5 | 84 | Ex | No |
| 1-6 | 79 | Ex - P(F) | No |
| 1-7 | 80 | Ex | No |
| 1-8 | 74 | Ex | No |
| 1-9 | 86 | Ex | No |
| 1-10 | 81 | Ex | No |
| Comparative Example | | | |
| 1-1 | 80 | P(C) | Slight |
| 1-2 | 82 | P(C) | Slight |
| 1-3 | 84 | P(A) | Slight |
| 1-4 | 78 | P(B) | Slight |
| 1-5 | 83 | P(C) | Slight |

TABLE 1

| | Component | Present Invention | | | | | | | | | | Comparative Example | | | | |
|---|---|---|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-1 | 1-2 | 1-3 | 1-4 | 1-5 |
| Organic acid and organic acid salt | Malonic acid | 0.50 | | | | | | | | | | 0.50 | | | | |
| | Succinic acid | 0.50 | 0.50 | | | | 10.0 | | 10.0 | | | 0.50 | | | | |
| | Glutaric acid | | | 2.00 | | | | | | | 5.00 | | 2.00 | | | |
| | Adipiic acid | | 2.00 | | 3.00 | | | 1.50 | | 2.50 | | | | | 1.50 | 2.50 |
| | Azelaic acid | | | | | 3.00 | | | | | | | | 3.00 | | |
| | Sebacic acid | | | 3.00 | | | | | | | | | 3.00 | | | |
| | Hydroxyacetic acid | | | | 2.00 | | | | | | | | | | | |
| | Monoethanol amine succinate | | | | | | | | 5.00 | 2.50 | | | | | | 2.50 |
| Rosin | WW rosin* | 1.00 | | | | 1.50 | | | | 2.50 | | 1.00 | | 1.50 | | |
| | Hydrogenated rosin | | | 0.50 | | 0.50 | | 1.00 | | | | | 0.50 | 0.50 | 1.00 | |
| Activator | Diethylamine hydrochlorate | 0.30 | | | | | | 0.05 | | | | 0.30 | | | 0.05 | |
| | Ethylamine bromate | 0.02 | | | | | | | | | 0.01 | 0.20 | | | | 0.01 |
| Solvent | Isopropyl alcohol | 81.95 | | 38.75 | | 70.00 | 84.00 | 50.00 | 92.70 | 40.00 | 75.00 | 97.95 | 47.25 | 95.00 | 64.61 | 70.48 |
| | Ethylalcohol | | 85.50 | | 44.00 | | | 25.45 | | | | | | | 32.84 | |
| | Dipropylene glycol monomethylether | | | 38.75 | 44.00 | | | | | 12.49 | | | 47.25 | | | 22.01 |
| Additive | KR-211 | 16.00 | | | 3.50 | 25.00 | | 12.00 | | | 10.00 | | | | | |
| | KR-216 | | | 17.00 | | | | | | | | | | | | |
| | KR-213 | | 12.00 | | 3.50 | | 6.00 | | | | | | | | | |
| | KR-9128 | | | | | | | | | | 10.00 | | | | | |
| | ES-1001N | | | | | | | | 10.00 | | | | | | | |
| | KR-206 | | | | | | | | | 1.30 | | | | | | |
| | DK X8-8048-4 | | | | | | | | | | 40.00 | | | | | |

Estimation of Corrosiveness

Ex: Suitable flux
(Deposited copper or plated copper is not corroded with flux.)

P: Unsuitable flux

A: Copper under flux is corroded and disappeared.

B: Copper under the edge of flux is corroded and disappeared.

C: Copper under the center of flux is corroded and disappeared.

D: The edge of flux is discolored because of corrosion and looks like an umbrella.

E: The center of flux is discolored because of corrosion.

F: The edge of flux looks opaque dark brown.

Example 2 (Soldering paste)

A thixotropic thickener was added to the flux composition obtained in Example 1 by use of an ink mixer (high viscosity mixer) to dissolve completely. Then solder particles shown in Table 5 were added to the dissolved flux composition and agitated until a uniform soldering paste is obtained. The flux composition and the amount of solder particles are shown in Table 4.

TABLE 4

|  | Present Invention |  |  |  |  | Comp. Example |  |
|---|---|---|---|---|---|---|---|
|  | 1 | 2 | 3 | 4 | 5 | 6 | 7 |
| Solder particles |  |  |  |  |  |  |  |
| A | 50 |  |  | 60 | 20 | 50 | 60 |
| B |  | 60 |  | 20 |  |  | 20 |
| C |  |  | 70 |  | 70 |  |  |
| Flux 1 | 40 |  |  | 5 |  |  |  |
| 2 |  | 35 |  | 13 | 8.5 |  |  |
| 3 |  |  | 27 |  |  |  |  |
| 11 |  |  |  |  |  | 40 |  |
| 12 |  |  |  |  |  |  | 15 |
| Hardened castor oil | 10 | 5 | 3 | 2 | 1.5 | 10 | 5 |

Hardened castor oil: thixotropic thickner

TABLE 5

| Solder particles | Composition | Shape |  |
|---|---|---|---|
| A | Sn/Pb (60/40) | Sphere | 50–150 mesh |
| B | Sn/Pb/Bi (55/40/5) | Nonsphere | 100–250 mesh |
| C | Sn/Pb/Ag (60/38/2) | Sphere | 100–250 mesh (60%) |
|  |  | Nonsphere | 50–150 mesh (40%) |

The spread factor, formation of solder balls, corrosiveness and stickness of the resulting soldering paste compositions were estimated. The spread factor was measured according to U.S. Standard QQ-S-571E. The corrosiveness was measured based on JIS-Z-3197 6.6. The solder ball test was conducted according to U.S. Standard ANSI/IPC-SP-819.

The stickness was estimated as follows: Copper plates were pretreated by the same procedures as those of the estimation of corrosiveness (JIS-Z-3197 6.6) and treated with the paste compositions followed by heat treatment at 250° C. for 5 seconds. The resulting plates are dried at room temperature and touched with a finger to classified into 3 groups: "No thicking (No)", "slight sticking (Slight)" and "sticking".

The results are shown in Table 6.

TABLE 6

| Soldering paste | Spread factor | Solder ball test | Corresiveness | Stickness |
|---|---|---|---|---|
| Present Invention |  |  |  |  |
| 2-1 | 77 | A | Ex | No |
| 2-2 | 73 | A | Ex | No |
| 2-3 | 79 | A | Ex | No |
| 2-4 | 74 | A | Ex | No |
| 2-5 | 70 | A | Ex | No |
| Comparative Example |  |  |  |  |
| 2-1 | 76 | A | P(A) | Slight |
| 2-2 | 70 | A | P(C) | Slight |

Estimation of solder ball test

A: Preferred
B: Acceptable
C: Unacceptable

Estimation of Corrosiveness

Ex: Suitable flux
(Deposited copper or plated copper is not corroded with flux.)

P: Unsuitable flux

A: Copper under flux is corroded and disappeared.

B: Copper under the edge of flux is corroded and disappeared.

C: Copper under the center of flux is corroded and disappeared.

D: The edge of flux is discolored because of corrosion and looks like an umbrella.

E: The center of flux is discolored because of corrosion.

F: The edge of flux looks opaque dark brown.

What we claim is:

1. An additive for fluxes and soldering pastes which have an organic acid or an organic acid salt wherein the additive comprises at least one silicone resin as a deactivation agent which reacts with the organic acid or the organic acid salt in the course of soldering.

2. An additive of claim 1 wherein the silicone resin is a thermosetting silicone resin which has silanol groups therein.

3. An additive of claim 2 wherein the thermosetting silicone resin has silanol and methoxy groups therein.

4. An additive of claim 2 wherein the silicone resin is selected from the group consisting of methylsilicone resins and methylphenylsilicone resins.

5. An additive of claim 2 wherein the silicone resin is a modified silicone resin.

6. An additive of claim 5 wherein the modified silicone resin is selected from the group consisting of alkyd modified silicone resins, polyester modified silicone resins, acryl modified silicone resins, epoxy modified silicone resins, phenol modified silicone resins, urethane modified silicone resins and melamine modified silicone resins.

7. An additive of claim 6 wherein the modified silicone resin is selected from the group consisting of epoxy modified silicone resins and phenol modified silicone resins.

8. An additive of claim 1 wherein the additive further comprises a solvent with a boiling point lower than the melting point of solder.

9. A flux comprising an organic acid or an organic acid salt wherein the flux further comprises at least one silicone resin as a deactivation agent which reacts with the organic acid or the organic acid salt in the course of soldering.

10. A flux of claim 9 wherein the silicone resin is selected from the group consisting of methylsilicone resins and methylphenylsilicone resins.

11. A flux of claim 9 wherein the silicone resin is a modified silicone resin.

12. A flux of claim 11 wherein the modified silicone resin is selected from the group consisting of alkyd modified silicone resins, polyester modified silicone resins, acryl modified silicone resins, epoxy modified silicone resins, phenol modified silicone resins, urethane modified silicone resins and melamine modified silicone resins.

13. A flux of claim 9 wherein the molar ratio of COOH groups in the organic acid or in the organic acid salt to the silanol groups in the silicone resin (COOH:-SiOH) ranges from 1:0.05 to 10.

14. A flux of claim 13 wherein the molar ratio of COOH groups in the organic acid or in the organic acid salt to the silanol groups in the silicone resin (COOH:-SiOH) ranges from 1:0.5 to 1.5.

15. A flux of claim 9 wherein the flux further comprises a solvent with a boiling point lower than the melting point of solder.

16. A flux of claim 9 wherein the flux further comprises abietic acid or abietic acid derivatives.

17. A soldering paste comprising the flux of claim 9 and soldering particles.

18. A soldering paste of claim 17 wherein the amount of the soldering particles ranges from 40 to 95 parts by weight and the amount of the flux ranges from 5 to 60 parts by weight.

19. A soldering paste of claim 17 wherein the soldering particles selected from the group consisting of tin-lead alloys, silver-tin-lead alloys, bismuth-tin-lead alloys, gold-tin-lead alloys and iridium-tin-lead alloys.

* * * * *